UNITED STATES PATENT OFFICE 2,478,452

PRODUCTION OF PYRROLE

Richard B. Bishop, Haddonfield, and William I. Denton, Woodbury, N. J., assignors to Socony-Vacuum Oil Company, Incorporated, a corporation of New York No Drawing. Application February 20, 1946, Serial No. 649,119

7 Claims. (Cl. 260—313)

This invention relates to the production of pyrrole, and is more particularly concerned with a catalytic process for the production of pyrrole.

Pyrrole is a well known compound. It is useful as an intermediate in many organic synthesis, particularly in the manufacture of several important drugs.

As is well known to those familiar with the art, pyrrole has been produced from coal tar and from oils obtained by the destructive distillation of bones in the preparation of bone charcoal. It has been prepared synthetically by passing acetylene and ammonia over bauxite, for example, at temperatures upwards of about 600° F., preferably, at a temperature of about 1020° F.; by distilling succinimide in the presence of zinc dust; by heating 1,4-diketones or aldehydes in an atmosphere of ammonia; and by passing furan and ammonia over activated alumina, at temperatures of about 1020° F.

We have now found it possible to obtain good ultimate yields of pyrrole by reacting furan with ammonia at temperatures appreciably below 1020° F.

We have discovered that by reacting furan with ammonia in the presence of catalytic material comprising a molybdenum oxide or a vanadium oxide, good ultimate yields of pyrrole can be obtained at temperatures appreciably below 1020° F.

Accordingly, it is an object of the present invention to provide an efficient process for producing pyrrole. Another object is to provide an efficient catalytic process for producing pyrrole from furan. A very important object is to provide an improved catalytic process for producing pyrrole by reacting furan with ammonia. Other objects and advantages of the present invention will become apparent to those skilled in the art from the following description.

Broadly stated, the present invention provides an improved process for the production of pyrrole, which comprises contacting furan with ammonia, in gaseous phase, in the presence of catalytic material comprising a molybdenum oxide or a vanadium oxide, at temperatures falling within a well-defined temperature range.

The proportions of reactants, i. e., furan and ammonia, used in our process may be varied over a wide range with little effect on the conversion per pass and ultimate yield. Theoretically, in our process, one mole of furan reacts with one mole of ammonia to produce one mole of pyrrole in accordance with the following equation:

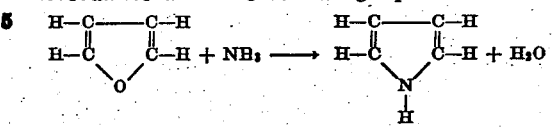

In practice, however, we prefer to use charges containing a molar excess of ammonia over furan, although if desired, the charge may contain as little as 2 mol % or as much as 98 mol % of furan.

In accordance with our invention, the catalysts to be used in obtaining pyrrole from furan, are those containing a molybdenum oxide or a vanadium oxide, such as molybdenum sesquioxide ($Mo_2O_3$), molybdenum dioxide ($MoO_2$), molybdenum trioxide ($MoO_3$), molybdenum pentoxide ($Mo_2O_5$), vanadium monoxide ($VO$), vanadium trioxide ($V_2O_3$), vanadium dioxide ($VO_2$), and vanadium pentoxide ($V_2O_5$). However, we prefer to use molybdenum trioxide or vanadium pentoxide as the catalytic material in view of the fact that these are the oxides formed on regeneration. Therefore, and in the interest of brevity, it must be clearly understood that when we speak of molybdenum oxide or of vanadium oxide herein and in the claims, we have reference to the various oxides of molybdenum and vanadium.

While these metal oxides exhibit considerable effectiveness from the standpoint of catalytic activity when used per se, they generally possess additional catalytic activity when used in conjunction with the well known catalyst supports, such as alumina, silica gel, carborundum, pumice, clays and the like. We especially prefer to use alumina ($Al_2O_3$) as a catalyst support, and we have found that catalysts comprising molybdenum trioxide or vanadium pentoxide supported on alumina are particularly useful for our purpose. Without any intent of limiting the scope of the present invention, it is suspected that the enhanced catalytic activity of the supported catalysts is attributable primarily to their relatively large surface area.

The concentration of catalytic metal oxide in the supported catalysts influences the conversion per pass. In general, the conversion per pass increases with increase in the concentration of catalytic metal oxide. For example, we have found that a catalyst comprising 20 parts by weight of a molybdenum trioxide on 80 parts by weight of alumina is more effective than one comprising 10 parts by weight of a molybdenum trioxide on 90 parts by weight of alumina. It is to be understood, however, that supported catalysts containing larger or smaller amounts of catalytic metal oxide may be used in our process.

In operation, the catalysts become fouled with carbonaceous material which ultimately affects their catalytic activity. Accordingly, when the efficiency of the catalyst declines to a point where further operation becomes uneconomical or disadvantageous from a practical standpoint, the catalyst may be regenerated as is well known in the art, by subjecting the same to a careful oxidation treatment, for example, by passing a stream of air or air diluted with flue gases over it under appropriate temperature conditions and for a suitable period of time, such as the same period of time as the catalytic operation. Preferably, the oxidation treatment is followed by a purging treatment, such as passing over the catalyst a stream of purge gas, for example, nitrogen, carbon dioxide, hydrocarbon gases, etc.

The reaction or contact time, i. e., the period of time during which a unit volume of the reactants is in contact with a unit volume of catalyst, may vary between a fraction of a second and several minutes. Thus, the contact time may be as low as 0.01 second and as high as 20 minutes. We prefer to use contact times varying between 0.1 second and one minute, particularly, between 0.3 second and 30 seconds. It must be realized that these figures are at best estimates based on a number of assumptions. For all practical purposes, as in catalytic processes of the type of the present invention, the more reliable data on contact time is best expressed, as is well known in the art, in terms of liquid space velocities, in the present instance, the volume of liquid furan reactant per volume of catalyst per hour. For example, at atmospheric pressure, we have found that the space velocities may be varied considerably and that velocities varying between about ¼ and about 4 are quite satisfactory for the purposes of the present invention.

The temperatures to be used in our process vary between about 600° F. and about 1000° F., and preferably, between about 700° F. and about 900° F. The effect of the temperature on the conversion per pass was evaluated by making a series of tests in which the temperature employed was changed, using a catalyst comprising 20% of molybdenum trioxide on alumina, atmospheric pressure, a space velocity of ¼, and a molar ratio of ammonia to furan of 2:1. The results obtained were as follows:

| Run No. | Temperature in ° F. | Per Cent Conversion per Pass Based on Weight of Furan |
|---|---|---|
| 1 | 600 | 3 |
| 2 | 700 | 7 |
| 3 | 800 | 10 |
| 4 | 1,000 | 7.5 |

The process of the present invention may be carried out at subatmospheric, atmospheric, or superatmospheric pressures. Superatmospheric pressures are advantageous in that the unreacted furan condenses more readily. In practice, atmospheric pressure or moderately subatmospheric or superatmospheric pressures are preferred.

The present process may be carried out by making use of any of the well-known techniques for operating catalytic reactions in the vapor phase effectively. By way of illustration, furan and ammonia may be brought together in suitable proportions and the mixture vaporized in a preheating zone. The vaporized mixture is then introduced into a reaction zone containing a catalyst of the type defined hereinbefore. The reaction zone may be a chamber of any suitable type useful in contact-catalytic operations; for example, a catalyst bed contained in a shell, or a shell through which the catalyst flows concurrently, or countercurrently, with the reactants. The vapors of the reactants are maintained in contact with the catalyst at a predetermined elevated temperature and for a predetermined period of time, both as set forth hereinbefore, and the resulting reaction mixture is passed through a condensing zone into a receiving chamber. It will be understood that when the catalyst flows concurrently, or countercurrently, with the reactants in a reaction chamber, the catalyst will be thereafter suitably separated from the reaction mixture by filtration, etc. The reaction mixture will be predominantly a mixture of pyrrole, unchanged furan, and unchanged ammonia. The pyrrole and the unchanged furan will be condensed in passing through the condensing zone and will be retained in the receiving chamber. Pyrrole can be separated from the unchanged furan by any of the numerous and well known separation procedures, such as fractional distillation. The unchanged furan and ammonia can be recycled, with or without fresh furan and ammonia, to the process.

It will be apparent that the process may be operated as a batch or discontinuous process as by using a catalyst-bed-type reaction chamber in which the catalytic and regeneration operations alternate. With a series of such reaction chambers, it will be seen that as the catalytic operation is taking place in one or more of the reaction chambers, regeneration of the catalyst will be taking place in one or more of the other reaction chambers. Correspondingly, the process may be continuous when we use one or more catalyst chambers through which the catalyst flows in contact with the reactants. In such a continuous process, the catalyst will flow through the reaction zone in contact with the reactants and will thereafter be separated from the reaction mixture as, for example, by accumulating the catalyst on a suitable filter medium, before condensing the reaction mixture. In a continuous process, therefore, the catalyst—fresh or regenerated—and the reactants—fresh or recycle—will continuously flow through a reaction chamber.

The following detailed examples are for the purpose of illustrating the preparation of pyrrole in accordance with the process of our invention and the advantages thereof, it being clearly understood that the invention is not to be considered as limited to the specific manipulations and conditions set forth in the examples.

A reactor containing 350 cc. of catalyst was used in each run. Furan and ammonia were pumped at varying rates through a preheater and heated to a temperature of 700° F. and then passed into the reactor. The reaction mixture was passed through a condenser into a receiving chamber. The material which condensed was subjected to a fractional distillation. The pertinent data and the results obtained were as follows:

| Example No. | Furan, Moles per hr. | Ammonia, Moles Per hr. | Reactor Temperature, °F. | Pressure | Space Velocity | Contact Time, Seconds | Catalyst | Conversion per pass per cent by weight of Furan |
|---|---|---|---|---|---|---|---|---|
| 1 | 2.4 | 4.8 | 700 | atmos. | ½ | 3 | Activated Alumina. | less than 0.5. |
| 2 | 2.4 | 4.8 | 700 | atmos. | ½ | 3 | 20% MoO$_3$ on Activated Alumina. | 7.0. |
| 3 | 1.2 | 2.4 | 800 | atmos. | ¼ | 6 | ...do... | 10.0. |
| 4 | 2.4 | 4.8 | 800 | atmos. | ½ | 3 | 10% V$_2$O$_5$ on Activated Alumina. | 8.0. |

It will be apparent that the present invention provides an efficient, inexpensive and safe process for obtaining pyrrole. Our process is of considerable value in making available relatively inexpensive pyrrole which is useful, for instance, as an intermediate in organic synthesis.

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

We claim:

1. A process for the production of pyrrole, which comprises contacting furan with ammonia, in gaseous phase, at temperatures varying between about 700° F. and about 900° F., in the presence of a molybdenum oxide supported on alumina as the catalyst.

2. A process for the production of pyrrole, which comprises contacting furan with ammonia, in gaseous phase, at temperatures varying between about 700° F. and about 900° F., in the presence of a vanadium oxide supported on alumina as the catalyst.

3. A process for the production of pyrrole, which comprises contacting furan with ammonia, in gaseous phase, at temperatures varying between about 600° F. and about 1000° F., in the presence of molybdenum trioxide supported on a catalyst support as the catalyst.

4. A process for the production of pyrrole, which comprises contacting furan with ammonia, in gaseous phase, at temperatures varying between about 600° F. and about 1000° F., in the presence of vanadium pentoxide supported on a catalyst support as the catalyst.

5. A process for the production of pyrrole, which comprises contacting furan with ammonia, in gaseous phase, at temperatures varying between about 700° F. and about 900° F., in the presence of molybdenum trioxide supported on alumina as the catalyst.

6. A process for the production of pyrrole, which comprises contacting furan with ammonia, in gaseous phase, at temperatures varying between about 700° F. and about 900° F., in the presence of vanadium pentoxide supported on alumina as the catalyst.

7. A process for the production of pyrrole, which comprises contacting furan with ammonia, in gaseous phase, at temperatures varying between about 600° F. and about 1000° F., in the presence of material selected from the group consisting of molybdenum oxide and vanadium oxide, supported on a catalyst support, as the catalyst.

RICHARD B. BISHOP.
WILLIAM I. DENTON.

REFERENCES CITED

The following references are of record in the file of this patent:

Sabatier, "Catalysis in Organic Chemistry," Van-Nostrand Co., New York (1922), pp. 252 and sec. 827. (Copy in Div. 6.)

Berichte, 69:2492 to 2496. (1936). (Copy in Sci. Library.)

Berkman et al., "Catalysis," Reinhold, New York (1940), page 549. (Copy in Div. 6.)

Chem. Abstracts 39:2750 (July 10, 1945). (Copy in Div. 6.)